United States Patent
Kovács et al.

(10) Patent No.: US 12,457,052 B2
(45) Date of Patent: Oct. 28, 2025

(54) RELATIVE TIME ERROR INFORMATION DISTRIBUTION IN PRECISION TIME PROTOCOL NETWORK

(71) Applicant: Telefonaktiebolaget LM Ericsson (publ), Stockholm (SE)

(72) Inventors: Gábor Kovács, Dunakeszi (HU); Stefano Ruffini, Rome (IT); Riccardo Rimarchi, Hässelby (SE); Mikael Johansson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 307 days.

(21) Appl. No.: 18/043,326

(22) PCT Filed: Aug. 31, 2021

(86) PCT No.: PCT/SE2021/050845
§ 371 (c)(1),
(2) Date: Feb. 27, 2023

(87) PCT Pub. No.: WO2022/045958
PCT Pub. Date: Mar. 3, 2022

(65) Prior Publication Data
US 2023/0283392 A1    Sep. 7, 2023

Related U.S. Application Data

(60) Provisional application No. 63/072,841, filed on Aug. 31, 2020.

(51) Int. Cl.
*H04J 3/06* (2006.01)
*H04L 7/00* (2006.01)

(52) U.S. Cl.
CPC .......... *H04J 3/0667* (2013.01); *H04L 7/0016* (2013.01)

(58) Field of Classification Search
CPC ...... H04J 3/0667; H04J 3/0673; H04J 3/0679; H04L 7/0016
See application file for complete search history.

(56) References Cited

U.S. PATENT DOCUMENTS 8,995,473 B2 *  3/2015  Zheng ................. H04J 3/0667
                                          370/516
9,295,018 B1    3/2016  Ruffini et al.
(Continued)

FOREIGN PATENT DOCUMENTS

| EP | 3270531 A1 | 1/2018 |
| WO | 2016036291 A1 | 3/2016 |
| WO | 2016099351 A1 | 6/2016 |

OTHER PUBLICATIONS

International Search Report and Written Opinion for Application No. PCT/SE2021/050845, Dec. 1, 2021, 13 pages.
(Continued)

*Primary Examiner* — Alpus Hsu
(74) *Attorney, Agent, or Firm* — Nicholson De Vos Webster & Elliott LLP (57) ABSTRACT

There is provided mechanisms for relative time error (TE) information distribution in a telecommunication network using a precision time protocol (PTP). A method is performed in a gateway device in a telecommunication network having hierarchical segments. The method comprises receiving TE information from a telecom grandmaster (T-GM) of the hierarchical segments. The method comprises preserving a total TE information of the received TE information. The method comprises resetting an accumulated path TE of the received TE information. The method comprises outputting an indication of the reset accumulated path TE and the preserved total TE information to a sub-segment of the hierarchical segments.

11 Claims, 9 Drawing Sheets

(56) References Cited

U.S. PATENT DOCUMENTS

| | | | |
|---|---|---|---|
| 9,485,744 B2 | 11/2016 | Klockar et al. | |
| 9,571,216 B2* | 2/2017 | Le Pallec | H04L 69/40 |
| 9,661,595 B2 | 5/2017 | Ruffini et al. | |
| 9,709,680 B2* | 7/2017 | Achanta | G01S 19/215 |
| 10,075,258 B2* | 9/2018 | Dutti | H04L 45/12 |
| 2013/0083809 A1* | 4/2013 | Renaux | H04J 3/0673 |
| | | | 370/503 |
| 2013/0100832 A1 | 4/2013 | Flinn et al. | |
| 2020/0133330 A1* | 4/2020 | Bordogna | G06F 1/14 |
| 2020/0153520 A1* | 5/2020 | Yamagishi | H04L 65/611 |
| 2021/0303021 A1* | 9/2021 | Cui | H04J 3/0667 |
| 2021/0367695 A1* | 11/2021 | Moon | H04J 3/12 |
| 2022/0060310 A1* | 2/2022 | Arai | H04L 45/3065 |

OTHER PUBLICATIONS

Tim Frost, "Draft Amendment 1 to Recommendation ITU-T G.8271. 1," Mar. 2020, 62 pages, Calnex Solutions Ltd.

Peter Meyer et al., "Considerations on Definition & Use of Relative TE [G.8271.1, G.8273.2, G.8260]," Mar. 8-22, 2019, 12 pages, Microsemi Corporation.

"Series G: Transmission Systems and Media, Digital Systems and Networks," Mar. 2020, 62 pages, Recommendation ITU-T G.8275. 1/Y.1369.1, International Telecommunication Union.

IEEE Standard for a Precision Clock Synchronization Protocol for Networked Measurement and Control Systems, 2019, 499 pages, IEEE Std 1588™-2019, IEEE.

Written Opinion of the International Preliminary Examining Authority for Application No. PCT/SE2021/050845, Jul. 13, 2022, 6 pages.

International Preliminary Report on Patentability for Application No. PCT/SE2021/050845, Nov. 9, 2022, 9 pages.

* cited by examiner

Table 130-ENHANCED_ACCURACAY_METRICS TVL format

| Bits 7 6 5 4 3 2 1 0 | Octets | TLV offset |
|---|---|---|
| tlvType | 2 | 0 |
| lengthField | 2 | 2 |
| bcHopCount | 1 | 4 |
| tcHopCount | 1 | 5 |
| Reserved | 2 | 6 |
| maxGmInaccuracy | 8 | 8 |
| varGmInaccuracy | 8 | 16 |
| maxTransientInaccuracy | 8 | 24 |

| Bits 7 6 5 4 3 2 1 0 | Octets | TLV offset |
|---|---|---|
| varTransientInaccuracy | 8 | 32 |
| maxDynamicInaccuracy | 8 | 40 |
| varDynamicInaccuracy | 8 | 48 |
| maxStaticInstanceInaccuracy | 8 | 56 |
| varStaticInstanceInaccuracy | 8 | 64 |
| maxStaticMediumInaccuracy | 8 | 72 |
| varStaticMediumInaccuracy | 8 | 80 |

RELATIVE TIME ERROR INFORMATION DISTRIBUTION IN PRECISION TIME PROTOCOL NETWORK

CROSS-REFERENCE TO RELATED APPLICATIONS

This application is a National stage of International Application No. PCT/SE2021/050845, filed Aug. 31, 2021, which claims priority to U.S. Provisional Application No. 63/072,841, filed Aug. 31, 2020, which are hereby incorporated by reference.

TECHNICAL FIELD

The present disclosure relates to a method, gateway, computer program, and computer program product, for relative time error information distribution in a telecommunication network using precision time protocol.

BACKGROUND

In the evolution of fourth generation (4G) mobile technology towards fifth generation (5G) mobile technology, there is an increased variety of services requiring that an accurate time/phase reference is available at the remote radio unit (RRU)/baseband unit (BBU) sites, with accuracy level dependent on the specific mobile service to be supported, for example (see, ITU-T G.8271 relating to recommendations for time and phase synchronization aspects of telecommunication networks):

Long-term evolution (LTE)-time division duplexing (TDD), new radio (NR)-TDD: ±1500 ns Carrier Aggregation (Inter-band) time alignment error (TAE): 260 ns Observed Time Difference Of Arrival (OTDOA): ±x—100 ns (with the value of x depending on specific service requiring positioning).

The requirement for TDD is defined as an absolute time error between an ideal reference (traceable to Coordinated Universal Time (UTC)) and the timing signal on the radio interface (1500 ns).

From a network perspective, limits have been defined at network interfaces by ITU-T in Recommendation G.8271.1 (e.g., 1.1 µs at the input of the radio base station) to make sure that eventually 1500 ns is met on the radio interface.

Other types of requirements are expressed in terms of TAE, which is a relative measure between two end points.

Figure 1:
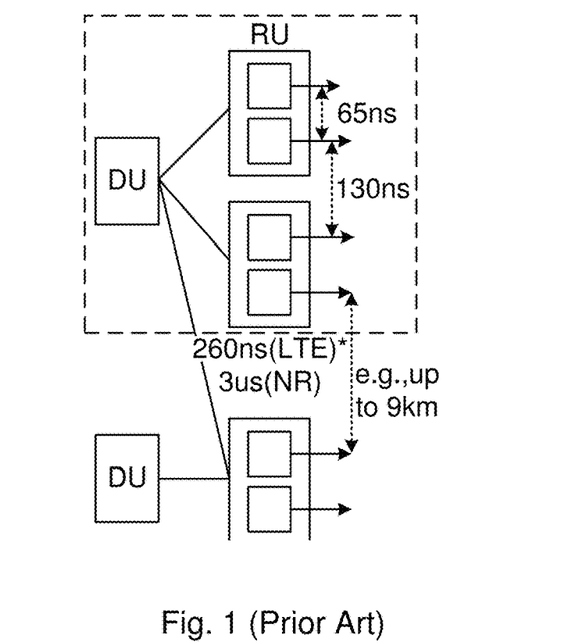
FIG. 1 is a diagram schematically illustrating maximum relative time error requirements with typical applications.

FIG. 1 illustrates two digital units (DUs) and three radio units (RUs). The first DU is connected to two RUs, all e.g. arranged on the same roof (where the cell cite is illustrated with dashed lines). The second DU is connected to one RU, not on the same place as the first DU with the connected two RUs. The most stringent level of accuracy between different antennas in a RU is 65 ns, and between different antennas in adjacent RUs it is 130 ns. The level of accuracy is 260 ns between different antennas to other cell sites for LTE and 3 µs for NR. The maximum relative TE requirements for different levels of accuracy is provided in Table 1 below, together with typical applications for each level of accuracy.

TABLE 1

Maximum relative TE requirements for different levels of accuracy

| Level of accuracy (G.8271) | Maximum Relative Time error requirements | Typical application |
|---|---|---|
| 3A | 5 µs | LTE multicast-broadcast single-frequency network (MBSFN) |
| 4A | 3 µs | NR Intra-band non-contiguous (frequency range 1 (FR1) only) and Inter-band carrier aggregation, with or without multiple-input multiple-output (MIMO) or transmit (TX) diversity. |
| 6A | 260 ns | LTE Intra-band non-contiguous carrier aggregation with or without MIMO or TX diversity, and inter-band carrier aggregation with or without MIMO or TX diversity NR Intra-band contiguous carrier aggregation (both FR1 and FR2) and Intra-band non-contiguous (FR2 only) carrier aggregation, with or without MIMO or TX diversity |
| 6B | 130 ns | LTE Intra-band contiguous carrier aggregation, with or without MIMO or TX diversity NR (FR2) Intra-band contiguous carrier aggregation, with or without MIMO or TX diversity |
| 6C | 65 ns | LTE and NR MIMO or TX diversity transmission, at each carrier frequency |

For these levels of accuracies, more than the absolute time error with respect to an ideal reference is needed; what matters is the relative time error that is generated from the nearest common point for the end points.

Figure 2:
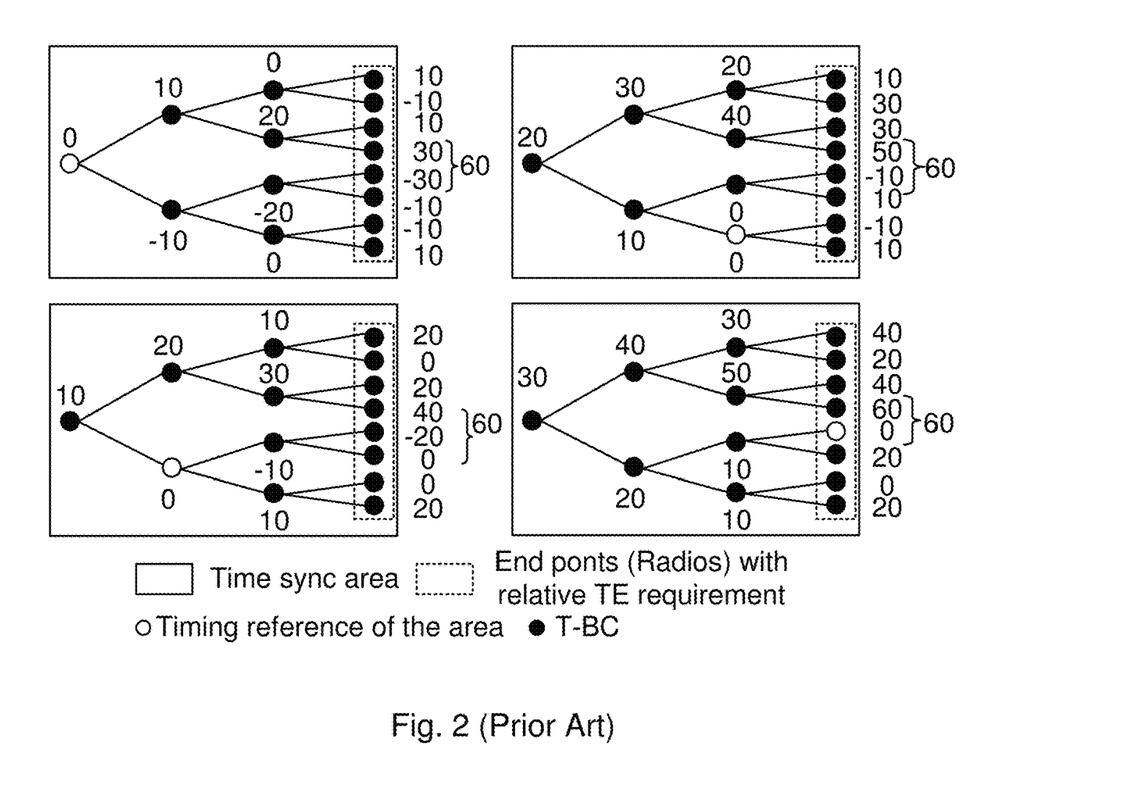
FIG. 2 is a diagram schematically illustrating four examples of relative TE of end points.

This is clarified with some examples in FIG. 2. FIG. 2 is a diagram schematically illustrating four examples of relative TE of end points. The numerical values show the absolute time error with respect to the timing reference. According to the example in FIG. 2, the tree topology grandmaster (GM) location does not change the relative TE of the end points for telecom boundary clock (T-BC). That is, (30−(−30))=(50−(−10))=(40−(−20))=(60−0)=60 ns.

In FIG. 2, the time error between two end points, in the worst case is given by the distance of each end point from the closest common node. The worst case is the same in all four examples, 60 ns.

In any case, to fulfil the relevant synchronization requirements, mobile operators must carefully plan their synchronization networks.

These new synchronization networks usually exploit a time/phase synchronization reference coming from a Global Navigation Satellite System (GNSS) receiver placed either locally or remotely to a radio base station (RBS) site, in the latter case exploiting the capability of IEEE 1588-2019, "IEEE Standard for a Precision Clock Synchronization Protocol for Networked Measurement and Control Systems" to transport an accurate time/phase reference throughout a packet network, where IEEE is short for Institute of Electrical and Electronics Engineers.

Within the IEEE 1588 workgroup, there is ongoing work to enhance an existing type-length-value (TLV) that can be attached to announce messages, to carry information on the performance (i.e. TE) that can be achieved across a PTP network.

Figure 3:
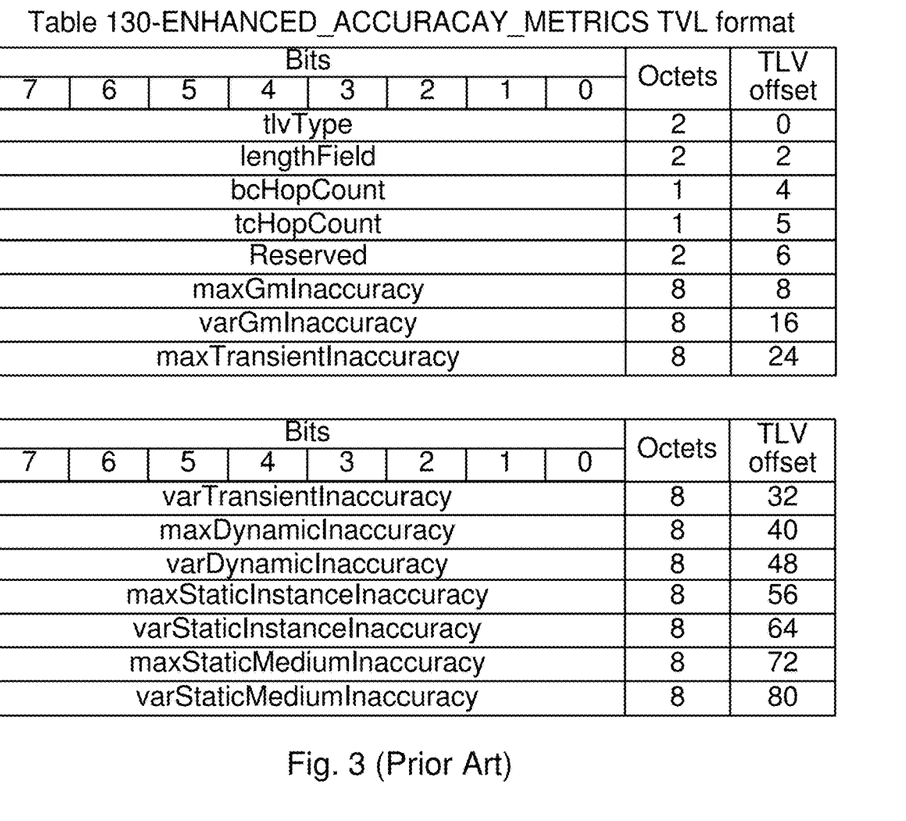
FIG. 3 is a table illustrating current TLV as specified by IEEE 1588.

The current TLV is specified by IEEE 1588-2019, "IEEE Standard for a Precision Clock Synchronization Protocol for Networked Measurement and Control Systems" as recaptured in the table illustrated in FIG. 3 (see, section 16.12 in aforementioned IEEE 1588-2019).

Various parameters can be accumulated by the clocks that are part of the PTP chain and carried over this TLV.

This TLV is currently being enhanced within the IEEE 1588 work group (WG) to allow a more flexible use. In particular, the intention is that each clock can add its contribution to the accumulated TE (referred as path_TE), for example using the following parameters as defined by ITU-T G.8271.1:

Dynamic Time Error (that can be based on half of the MTIE as specified by G.8273.2 for that specific clock): the quadratic value of this parameter is accumulated Constant Time Error (that can be based on the cTE as specified by G.8273.2 for that specific clock): the field in the TLV that can be used for this parameter could be the MaxStaticInstanceInaccuracy In addition, the GM of the chain can introduce a more precise estimation of the TE at its output (referred as GM_TE), for example using maxGmInaccuracy field, that could replace the grandmaster clockAccuracy information.

All this information can be used by the end node to estimate the worst-case TE that has been introduced along the PTP chain.

Two documents disclose developments in this area:
WO2016099351, Optimized Sync Architecture for Coordination Features, and
WO2016036291, Packet synchronization method supporting advanced LTE coordination features.

WO2016099351 provides a method for set up of the synchronization network in a way that the distance between the common clock of end nodes that need to be coordinated, is minimized. The assumption is that end nodes can achieve PTP flows from multiple paths. This happens for instance in case of Boundary clocks implementing multiple PTP instances (operating in different PTP domains), or in case of networks based on transparent clocks. The actual redundancy and set up of the synchronization hierarchy could be driven by ad hoc protocols being considered to control future synchronization networks such as based on IS-IS enhancements (essentially replacing the Best Master Clock Algorithms traditionally used in PTP networks).

WO2016036291 describes a method to identify the closest PTP-path common node for PTP-clients. The proposal in this document is to use this identified node/point to estimate more accurately the achievable relative phase sync accuracy. This could be done by accumulating data in a TLV: each clock adding its own clock ID and an estimate of the time error it contributes with. The end nodes, would need to exchange information on the received TLV, so that they can verify in which position is the closest common node, and evaluate the Time Error based on the information carried by the TLV TLV as described earlier carries the total accumulated time error, hence allows only for an estimate of the absolute time error.

Relative time error cannot be extracted from the TLV. Just considering the value carried by the TLV would lead to a wrong conservative estimation as it would carry the total time error from the grandmaster, and not the time error accumulated from the closest common clock.

WO2016099351 is a complementing solution that can be used to set up the network in an optimal way.

WO2016036291 would allow an accurate estimation of the relative time error. But the cost is quite high as every node would have to add quite significant amount of information (clock ID and its own time error contribution), that would lead even over a short network to a significant length for the TLV. Moreover, each end node has to exchange information between each other so that they can estimate the relative time error. Implementing such communication may lead to extra complexity.

SUMMARY

One objective is to improve relative time error information distribution in precision time protocol networks.

According to a first aspect there is presented a method for relative time error (TE) information distribution in a telecommunication network using a precision time protocol (PTP). The method is performed in a gateway device in a telecommunication network having hierarchical segments. The method comprises receiving TE information from a telecom grandmaster (T-GM) of the hierarchical segments, preserving a total TE information of the received TE information, resetting an accumulated path TE of the received TE information, and outputting an indication of the reset accumulated path TE and the preserved total TE information to a sub-segment of the hierarchical segments.

The resetting may comprise replacing a type-length-value (TLV) field of the received TE information to make the gateway device T-GM of subsequent segments. The resetting may further comprise setting an accumulated path TE field to zero.

The preserving may comprise setting a GM-TE field of the received TE information to a sum of a received GM-TE plus a path TE up to the gateway device.

The preserving may comprise forwarding a received TLV field unchanged. The preserving may further comprise appending a new TLV field with a local clock ID The resetting may comprise setting an accumulated path TE field in the appended new TLV to zero.

The telecommunications network may be configured with a higher-level segment to a lower-level segment, wherein TE information is propagated from the higher-level segment to the lover level segment.

A received priority parameter may be replaced by a priority parameter of the gateway device.

According to second aspect there is presented a gateway device for relative TE information distribution in a telecommunication network using a PTP. The gateway device comprises a processing circuitry and a computer program product storing instructions that, when executed by the processing circuitry, causes the gateway device to receive TE information from a T-GM of the hierarchical segments, preserve a total TE information of the received TE information, reset an accumulated path TE of the received TE information, and to output an indication of the reset accumulated path TE and the preserved total TE information to a sub-segment of the hierarchical segments.

According to third aspect there is presented a computer program for relative TE information distribution in a telecommunication network using a PTP. The computer program comprises computer program code which, when run in a gateway device of the telecommunication network using a PTP, causes the gateway device to receive TE information from a T-GM of the hierarchical segments, preserve a total TE information of the received TE information, reset an accumulated path TE of the received TE information, and to output an indication of the reset accumulated path TE and the preserved total TE information to a sub-segment of the hierarchical segments.

A computer program product comprising a computer program and a computer readable storage means on which the computer program is stored is also presented.

The present disclosure addresses the need to estimate relative time error that is achieved by end points that need to enable some feature that depends on relative time error requirements (e.g. Carrier Aggregation).

This is achieved by defining special usage of TLV specified in IEEE1588-2019 or similar protocol extensions. The special usage provides relative time error information directly, without any further external communication functionality needed.

Some key features of the present inventive concept are:
Definition of hierarchical PTP segments in a telecommunication network: while absolute time error requirements apply in the entire PTP network, the relative TE requirements are only applicable within each sub-segment.
There can be multiple hierarchy levels of the sub-segments, all of which preserves the absolute time error information, while relative time error is always applicable within the segment at the lowest hierarchy level.
When TE information is propagated from the main segment to the sub-segment, the path time error accumulation is reset while still preserving the total time error information from the T-GM.

To achieve the above features, there are various options, and the following are two possible embodiments:
Embodiment 1: replace GM_ID with the clock ID of the gateway device; set GM_TE to the sum of the original GM_TE plus the path TE accumulated up to this point; and set path TE to 0.
Embodiment 2: preserve original GM information (original TLV not changed), and append information (new TLV) about local clock ID as well as a new path TE field that counts TE from this clock.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 17-16 is a diagram schematically illustrating some components of devices presented herein; and FIG. 18-17 is a diagram schematically illustrating functional modules of a device presented herein.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

The present disclosure addresses relative time error (TE) information distribution problems by defining special usage of the type-length-value (TLV) specified in IEEE 1588-2019 or similar protocol extensions, that is originally only intended for absolute path TE information distribution. Such TLV or protocol extension may consist of one or more fields that describe a grandmaster (GM) time error, e.g. expected constant and dynamic components of the TE at the grandmaster output port, and one or more fields that describe an accumulated absolute time error of a synchronization path.

The present disclosure, unlike WO2016036291, provides relative TE information directly, without any further external communication functionality needed. Two main points of the present disclosure are:
Define hierarchical precision time protocol (PTP) segments: while absolute TE requirements apply in the entire PTP network, the relative TE requirement is only be applicable within each sub-segment. Such sub-segments may cover e.g. a group of radio units (RUs) that want to provide coordinated services towards user equipment (UE). There may be multiple hierarchy levels of the sub-segments, all of which preserves the absolute TE information, while relative TE is always applicable within the segment at the lowest hierarchy level, and
When TE information is propagated from a PTP segment of a higher hierarchy level, e.g. main PTP segment, to a lower hierarchy level, e.g. to the sub-segment, the path TE accumulation is reset while still preserving the total TE information from a telecom GM (T-GM).

In one embodiment a gateway device, at its outputs towards a sub-segment, replaces the fields of the TLV so that the gateway device can become the GM of the sub-segment. GM_TE is set to the sum of the original GM_TE plus the path time error up to the gateway device, while the accumulated path TE field is reset to zero to count TE from this clock.

In another embodiment a gateway device, at its outputs towards a sub-segment, forwards the original TLV unchanged, and appends a new TLV with a local clock ID as well as the accumulated path TE field reset to zero to count TE from this clock.

In some aspects it is ensured that only one node is the common point of synchronization for all end points within the sub-segment. This can be achieved for example by using priority2 and/or other IEEE 1588 parameters configurations.

In ring network topologies it might also be required to prevent that TE information is propagated from a sub-segment back to the main segment. This can be achieved for example by using Master-Only port configurations.

Radio access technologies such as time division duplexing (TDD) set requirements on the absolute TE allowed at the antenna reference point (ARP). In addition, coordinated features such as carrier aggregation (CA) require that the relative TE between any two cooperating ARPs does not exceed a certain threshold. The fulfilment of these requirements implies a significant renewal of the transport network infrastructure towards ITU-T G.8275.1 based architectures. Telecom operators who have started this network upgrade would like to be able to utilize it to the largest possible extent.

In this context, the present disclosure provides a simple and effective way to fulfil the relevant absolute TE and relative TE requirements while maintaining the G.8275.1 arrangements. For example, the TE information distribution is still based on existing PTP protocol and extensions, e.g., accuracy metrics TLV.

Further, all the relevant PTP concepts, for example, ports and messages are re-used, as well as the best master clock algorithm (BMCA) selection algorithm. A smooth integration of embodiments presented herein is achieved with the operator's current practices while taking advantage of the actual network topology to better address the timing objectives of the network.

The present disclosure does not rely on complicated additions, such as a path trace option collecting the identities and noise contribution of each intermediate clock device separately. It is worth noting that such a path trace option would in principle enable determining the TE at any intermediate point of the clock chain, but could become impractical for long chains and would also require additional communication and logic between the end points to determine the closest common point in the paths for the relative TE calculation. On the opposite, the present disclosure provides the relevant TE information directly to the nodes, with no need for any further external communication function.

The present disclosure provides effective means to partition a PTP network in segments which ensures that the absolute TE information is preserved while the relative TE information is distributed within the segment. Unlike other possible options, the present disclosure requires new functionalities only in the gateway nodes, which can be easily accomplished through mere software upgrades, whilst the rest of the network elements can still run standard PTP solutions with the existing standardized TLV.

One benefit achieved with the present disclosure is that its implementation requires very minor additions to existing standard solutions. By combining current PTP functions, new functionalities can be added.

A prerequisite for the present disclosure is a PTP network, where accumulated TE information is propagated using e.g. the accuracy metrics TLV option defined in IEEE 1588-2019, or similar protocol extension.

The PTP network is divided into hierarchical PTP segments. While absolute TE requirements apply in the entire PTP network, relative TE requirements is only applicable within each sub-segment of the PTP network.

A gateway device of the PTP network is configured to preserve the absolute TE information, while relative time error is provided within the sub-segment.

Only one gateway node can become the local GM of a sub-segment.

TE information cannot propagate from a segment at lower hierarchy level to a segment at higher hierarchy level.

Aspects of hierarchical PTP segments will now be disclosed.

There could be one or more hierarchy levels of the sub-segments, all of which preserves the absolute time error information, while relative time error requirement is always applicable within the segment at the lowest hierarchy level.

Figure 4:
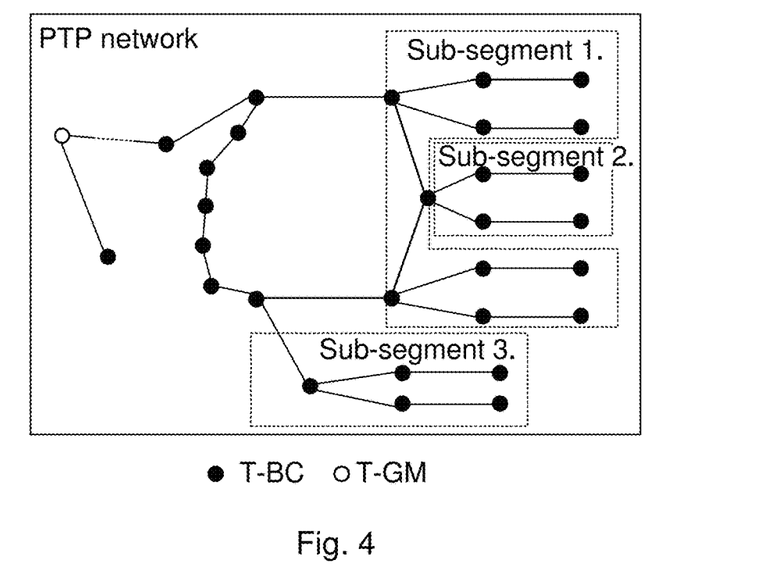
FIG. 4 is a schematic diagram schematically illustrating an example for multiple sub-segments.

An example for multiple sub-segments is illustrated in FIG. 4. FIG. 4 is a schematic diagram schematically illustrating an example for multiple sub-segments. A telecom GM (T-GM) is together with a plurality of T-BCs provided in a PTP network. Some of the T-BCs are provided in sub-segments, denoted sub-segments 1-3.

Such sub-segments may be created by implementing certain functionality in the gateway nodes of each sub-segment, as described in the following.

Aspects of gateway device operation will now be disclosed.

It is proposed, that when TE information is propagated from a main segment to a sub-segment via a gateway device, the path TE accumulation is reset while still preserving the total time error information from the T-GM. This will imply some added functionality in the gateway devices, while all other PTP entities in the network may run standard PTP implementation.

To achieve this, there are various options. Two embodiments follow:

In Embodiment 1 the grandmaster identity (GMID) is replaced; set gmTE to the sum of the original gmTE plus the pathTE accumulated up to this point; and set egress pathTE to zero.

Embodiment 2 the original TLV is preserved, and another TLV about local clock ID is appended as well as a new pathTE field that counts TE from this clock.

Figure 5A:
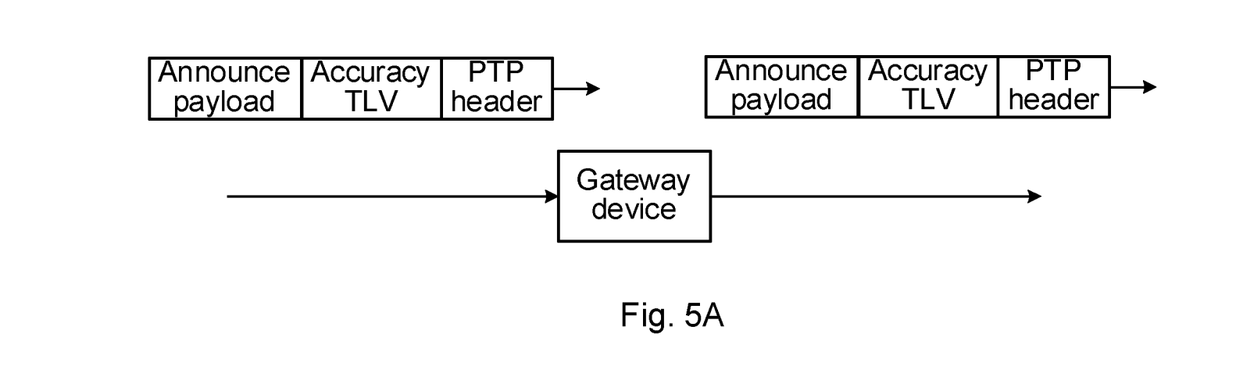
FIGS. 5A-B are diagrams schematically illustrating two example solutions.
Figure 5B:
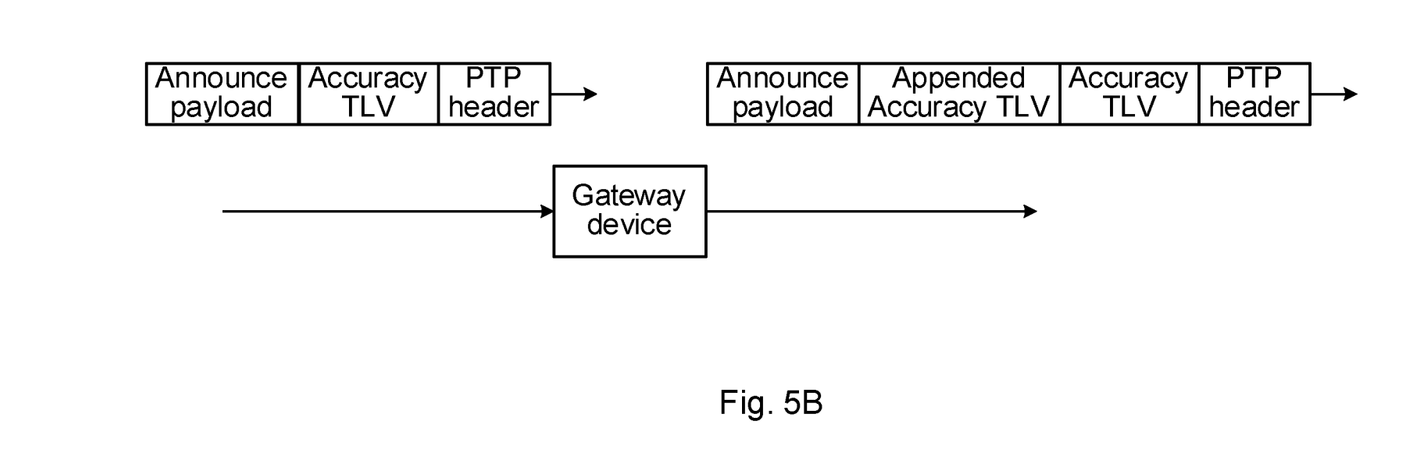

The two embodiments are depicted in FIGS. 5A and 5B, respectively. According to FIG. 5A the message structure stays the same, but according to FIG. 5B a TLV about local clock ID is appended to the message structure upon the message having passed the gateway device.

In the followings only embodiment 1 is described in detail, however the same principles can be applied in embodiment 2 as well.

Figure 6:
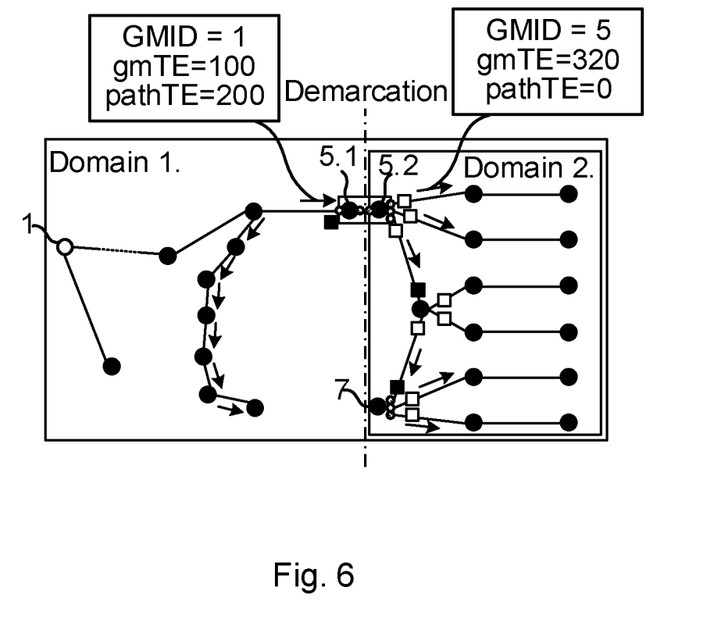
FIG. 6 is a diagram schematically illustrating update of accuracy TLV fields in a gateway PTP device.

FIG. 6 shows how the gateway device, as placed at the demarcation between Domain 1 and Domain 2, might update the accuracy TLV fields (it is noted that the term domain as used hereinafter has the same meaning as the previously used term sub-segment and that these terms can be used interchangeably; i.e., Domain 1 corresponds to sub-segment 1 and Domain 2 corresponds to sub-segment 2, etc.):

Replace GMID, so this device could (potentially) become the new GM of the sub-segment; In FIG. 6 the value of GMID is replaced so that GMID=5 in Domain 2, Replace the received GM_TE field: $gmTE_{out}=gmTE_{in}+pathTE_{in}+nodeTE_i$; In FIG. 6 the value of gmTE is replaced so that gmTE=320 in Domain 2, and Reset the accumulated TE field to pathTE$_{out}$=0 or potentially to the port relative TE (as per G.8273.2 port relative TE definition); In FIG. 6 the value of pathTE is replaced so that pathTE=0 in Domain 2 at the output of the gateway device at the demarcation.

With such simple steps the end application can use the pathTE field in the TLV for the maximum relative time error estimation within the segment using the formula:

$$MaxTE_R \leq 2 \cdot pathTE$$

Figure 7:
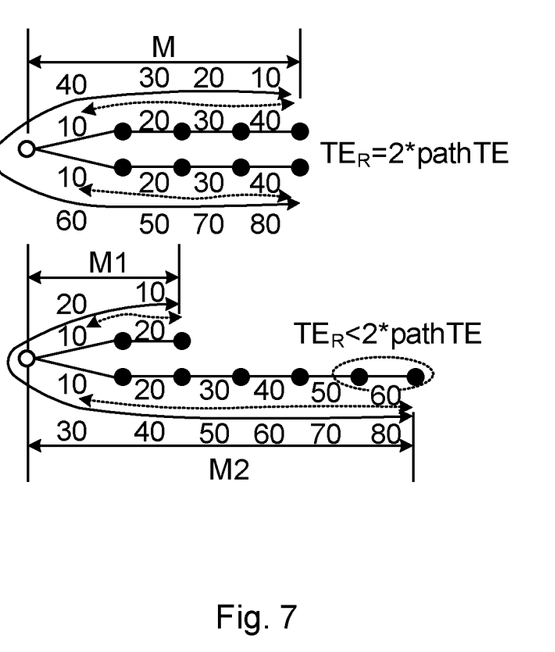
FIG. 7 is a diagram schematically illustrating effectiveness of use of a conservative estimation of maximum relative time error.

This is a conservative estimation of the maximum relative time error that leads to optimal maximum relative time error estimation in case of symmetrical network topology in the sub-segment, while suboptimal in case of asymmetrical topology, as explained in FIG. 7. The top example in FIG. 7 shows a symmetrical network topology where $TE_R = 2 \cdot pathTE$, whereas the bottom example in FIG. 7 shows a symmetrical network topology (M1 is shorter than M2) where $TE_R < 2 \cdot pathTE$.

Aspects of how to ensure a single local GM in each sub-segment will be disclosed next.

In order to avoid conflict, it is also required to make sure that one (and only one) node is the common point of synchronization for all end points within the sub-segment. This is important, since in case multiple gateway devices become local GM of the sub-segment, then closest common point will become a node outside the sub-segment, therefore PathTE field becomes meaningless.

Figure 8:
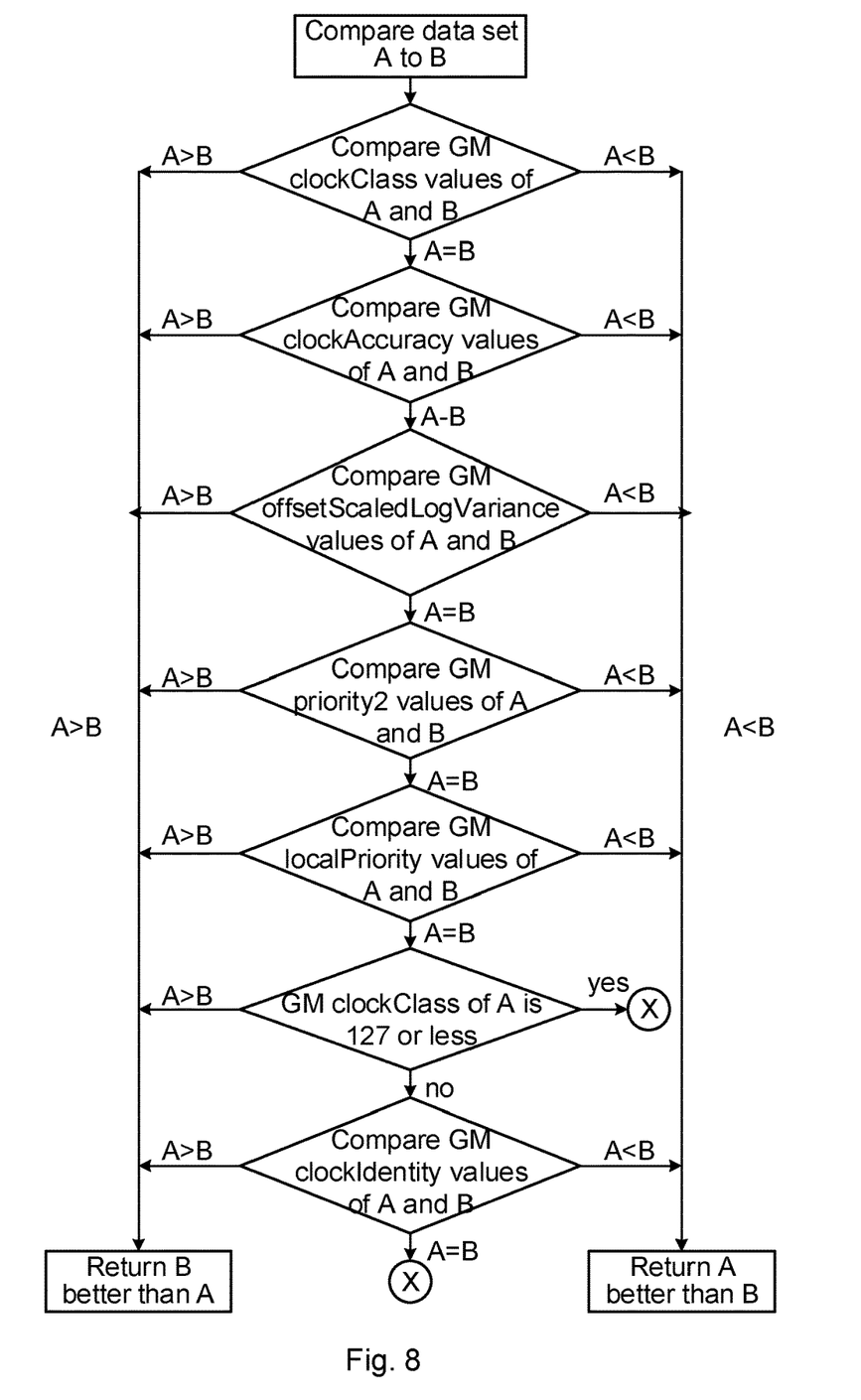
FIG. 8 is a flowchart schematically illustrating how a GM priority parameter need to be configured to achieve that only a single T-GM is selected by the BMCA algorithm specified in ITU-T G.8275.1 recommendation.

As a reference, the Alternate BMCA defined in G.8275.1 is shown in FIG. 8. FIG. 8 is flowchart schematically illustrating how the best T-GM is selected by the BMCA algorithm with details specified in the ITU-T G.8275.1 recommendation. The flowchart involves different comparisons of GM properties of data sets A and B to determine as to whether a gateway device with data set A or a gateway device with data set B is to be selected as T-GM.

Forcing a single PTP gateway device to become a local GM can be achieved in several ways. One example—in case Alternate BMCA is used in the PTP network—is to use the priority2 parameter (refer to Appendix IV "Considerations on the use of priority2" of ITU-T G.8275.1, "Precision time protocol telecom profile for phase/time synchronization with full timing support from the network."). Other configuration methods may also be possible to implement priority handling.

Figure 9:
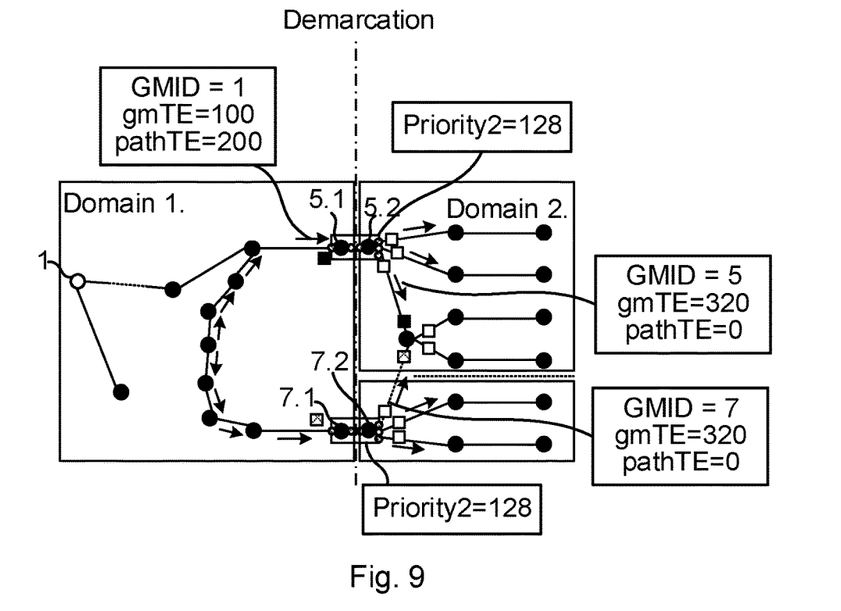
FIGS. 9-12 are diagrams schematically illustrating operation within two time protocol (PTP) sub-segments within which TE information is propagated according to presented solutions.

FIG. 9 shows how the subsegment fall into different branches if this issue is not addressed. In FIG. 9, the clocks in domain 2 locks to two different local GMs. One reason for this is that both local GMs are equal from a PTP quality perspective. But the paths to them from the end clocks differ, and this causes the end clocks to select different local GMs.

Figure 10:
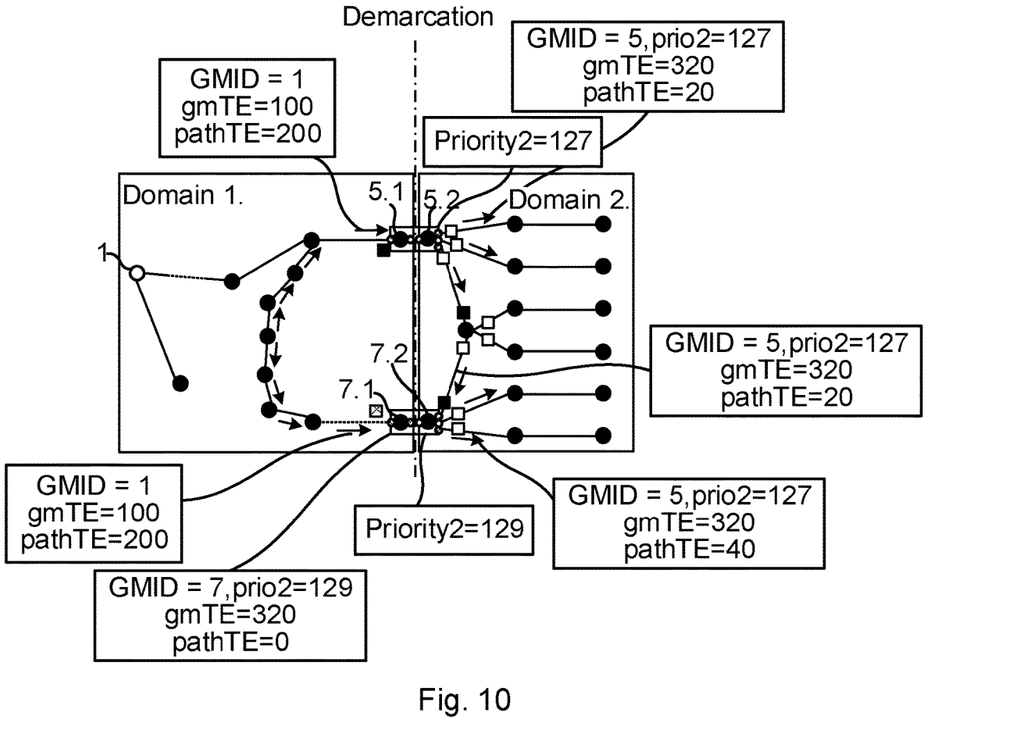

FIG. 10 explains how the proposed solution with setting priority2 appropriately in the gateway devices solves the problem in case there are two gateway devices in a subsegment with equivalent path to the main T-GM. Configuring different priority2 values on each PTP gateway device ensures that always a single gateway device is selected to be the master of the subsegment. This is because priority2 value comparison has precedence over stepsRemoved information when selecting the local GM.

TE information shall go from main segment to subsegment (and not backwards)

In ring network topologies it is also required to prevent that TE information is propagated from a sub-segment back to the main segment. This would lead to meaningless information in the TLV.

Figure 11:
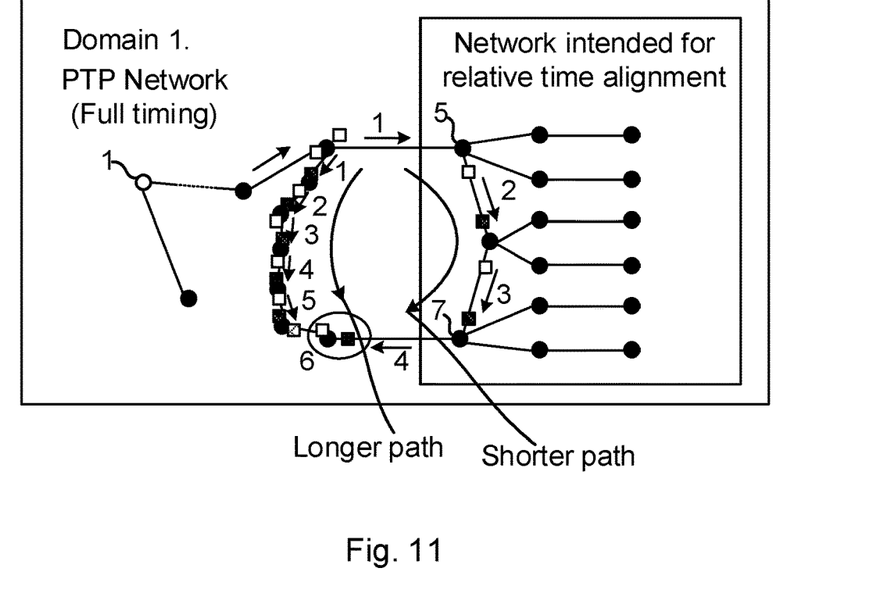

Such situation may happen if PTP path from the main T-GM to a node in the main segment is shorter through the subsegment than through the main segment, as shown in FIG. 11.

Figure 12:
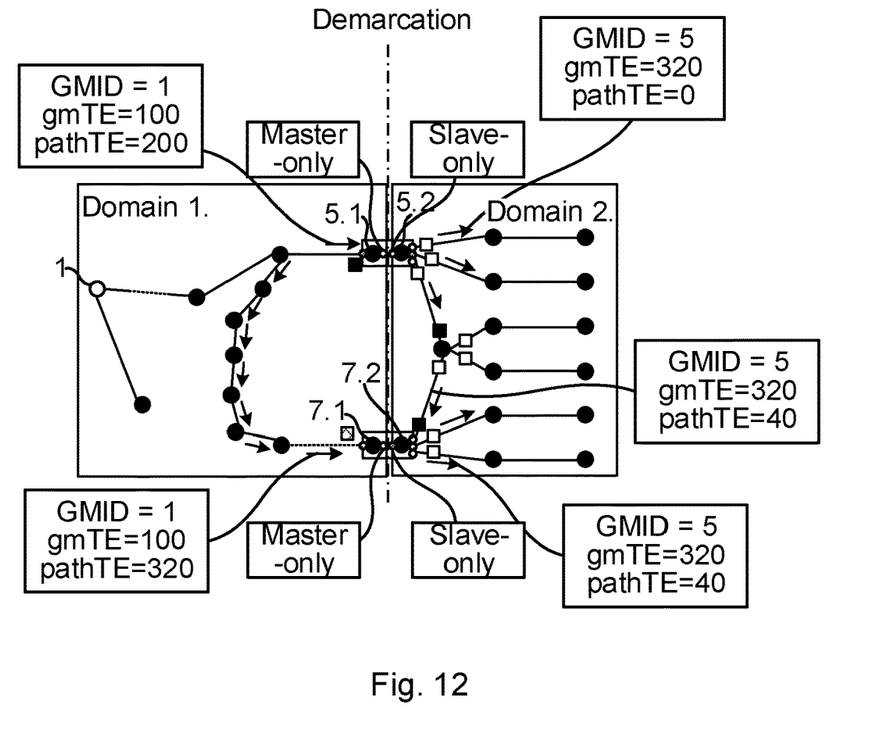

This issue can be prevented for example by using Master-Only configurations of the PTP port, as illustrated in FIG. 12. In this case the PTP port of the gateway device facing to the higher hierarchy level domain (Domain 1) is configured in "slave only" mode, hence this port will never become a master and will not propagate synchronization signal from the sub-domain (Domain 2) to the main domain (Domain 1).

Figure 13:
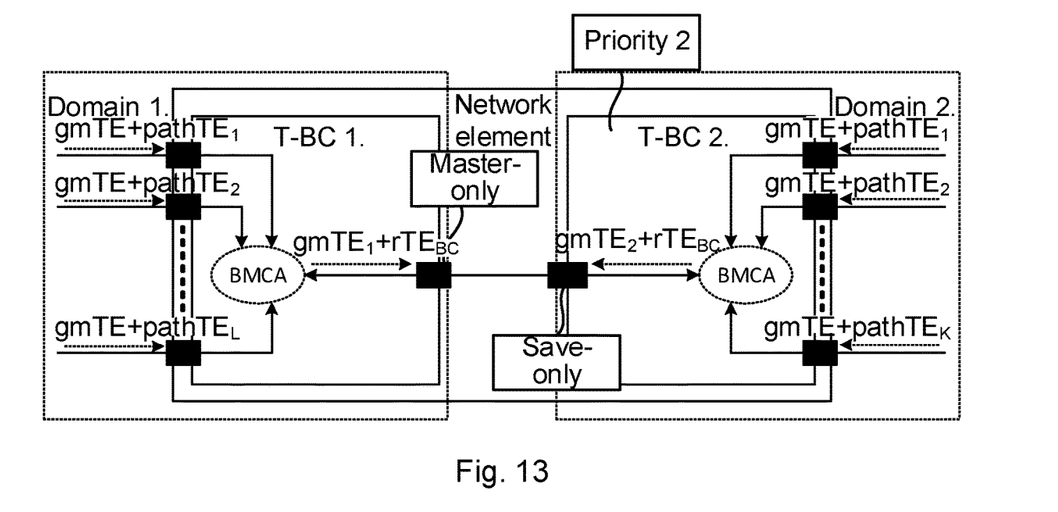
FIGS. 13-14 are diagrams schematically illustrating a demarcation zone between zones of PTP sub-segments with further implementation details on the TE handling.
Figure 14:
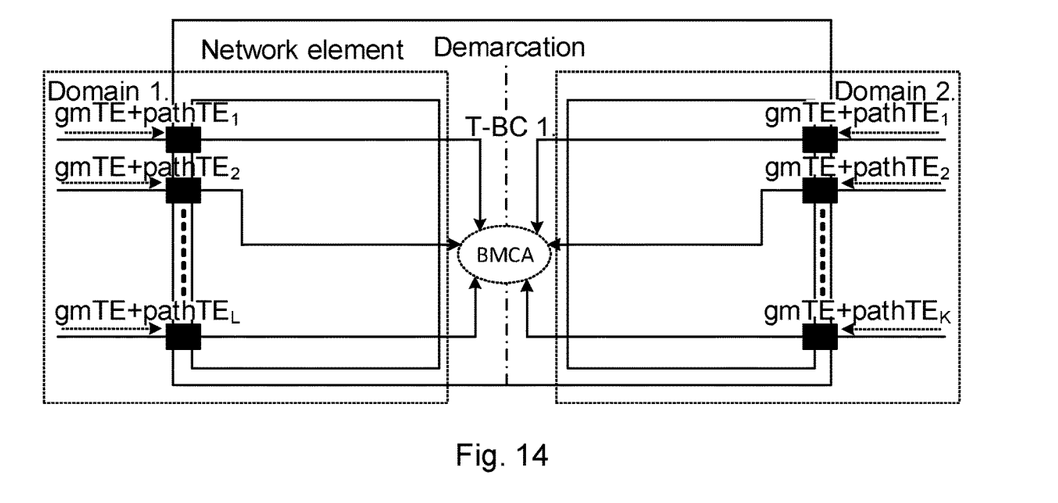

Further implementation details will now be disclosed with reference to FIG. 13 and FIG. 14.

There are multiple ways how such gateway function can be implemented, obvious for a person skilled in the art. In case multiple interfaces needs to be handled both in the main segment and the subsegment, and the implementation shall be kept as close to standard PTP implementation as possible, then two T-BC functions might be implemented within the gateway device (in which the network element illustrated in FIG. 13 can be provided) and apply priority2 (illustrated as "Priority 2" in FIG. 13) and Slave-only/Master-only port configuration between Domain 1 and Domain 2 as is shown in FIG. 13.

However, it is also possible to implement such function in a single T-BC entity between Domain 1 and Domain 2 by applying some proprietary solutions for the port selection and priority handling, as illustrated in FIG. 14.

Figure 15:
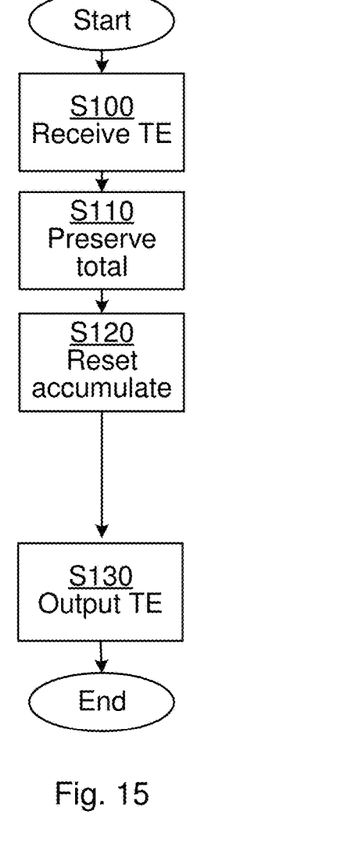
FIGS. 15-16 are flowcharts schematically is a flowchart illustrating-embodiments of methods presented herein a method for relative TE information distribution in a PTP network.

According to an aspect, an embodiment of a method for relative TE information distribution in a PTP network is presented with reference to FIG. 15. The method is performed in a gateway device 1 in a PTP network having hierarchical segments. In processing block S100 TE information is received from a T-GM of the hierarchical segments. In processing block S110 a total TE information of the received TE information is preserved. In processing block S120 an accumulated path TE of the received TE information is reset. In processing block S130 an indication of the reset accumulated path TE and the preserved total TE information are output to a sub-segment of the hierarchical segments.

In processing block S120, the resetting may comprise replacing a TLV field of the received TE information to make the gateway device T-GM of subsequent segments.

The resetting may further comprise setting an accumulated path TE field to zero.

In processing block S110, the preserving may comprise setting a GM-TE field of the received TE information to a sum of a received GM-TE plus a path TE to the gateway device.

In processing block S110, preserving may comprise forwarding a TLV field unchanged.

The preserving may further comprise appending a new TLV field with a local clock ID.

In processing block S120, the resetting may comprise setting an accumulated path TE field to zero.

The telecommunication network may be configured with a higher-level segment to a lower-level segment, wherein TE information is propagated from the higher-level segment to the lover level segment.

A received priority parameter may be replaced by a priority parameter of the gateway device.

Figure 16:
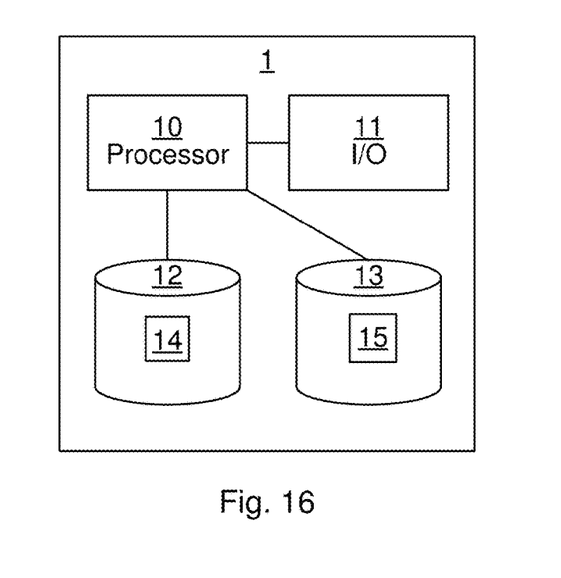

According to an aspect, an embodiment of a gateway device for relative TE information distribution in a telecommunication network using a PTP is presented with reference to FIG. 16. The gateway 1 comprises a processing circuitry 10 and a computer program product 12, 13 storing instructions 14, 15 that, when executed by the processing circuitry, causes the gateway device 1 to receive TE information from a T-GM of the hierarchical segments, preserve a total TE information of the received TE information, reset an accumulated path TE of the received TE information, and to output an indication of the reset accumulated path TE and the preserved total TE information to a sub-segment of the hierarchical segments.

FIG. 16 is a schematic diagram showing some components of the gateway device 1. The processing circuitry 10 may be provided using any combination of one or more of a suitable central processing unit, CPU, multiprocessing circuitry, microcontroller, digital signal processing circuitry, DSP, application specific integrated circuit etc., capable of executing software instructions of a computer program 14 stored in a memory. The memory can thus be considered to be or form part of the computer program product 12. The processing circuitry 10 may be configured to execute methods described herein with reference to FIG. 15.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processing circuitry 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the gateway device 1.

The gateway device 1 may further comprise an input/output (I/O) interface 11 including e.g. a user interface. The gateway device 1 may further comprise a receiver configured to receive signalling from other nodes, and a transmitter configured to transmit signalling to other nodes (not illustrated). Other components of the PSU 1 are omitted in order not to obscure the concepts presented herein.

Figure 17:
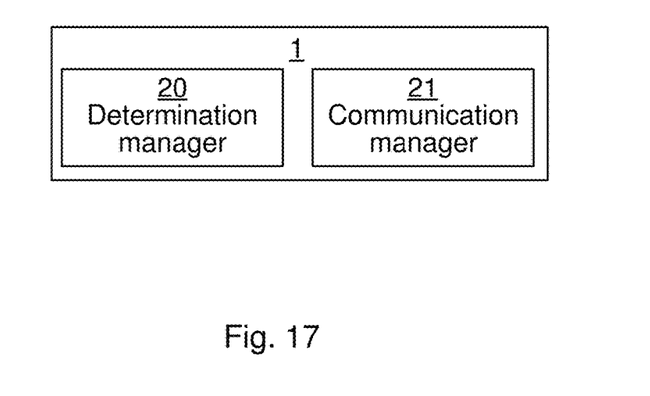

FIG. 17 is a schematic diagram showing functional blocks of the gate way device 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the process blocks in the method illustrated in FIG. 15, comprising a determination manager unit 20, and a communication manger unit 21. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manager 20 is for relative TE information distribution in a telecommunication network using a PTP. This module corresponds to the processing blocks S110 and S120 of FIG. 15. This module can e.g. be implemented by the processing circuitry 10 of FIG. 1716, when running the computer program.

The communication manager 21 is for relative TE information distribution in telecommunication network using a PTP. This module corresponds to the processing blocks S100 and S130 of FIG. 15. This module can e.g. be implemented by the processing circuitry 10 of FIG. 1716, when running the computer program.

The aspects of the present disclosure have mainly been described above with reference to a few embodiments and examples thereof. However, as is readily appreciated by a person skilled in the art, other embodiments than the ones disclosed above are equally possible within the scope of the disclosure, as defined by the claims.

LIST OF ABBREVIATIONS

| Abbreviation | Explanation |
| --- | --- |
| BMCA | Best Master Clock Algorithm |
| FeICIC | Further enhanced Inter-Cell Interference Coordination |
| GM | (PTP) Grandmaster |
| GNSS | Global Navigation Satellite System |
| LTE | Long-Term Evolution |
| MIMO | Multiple-input and multiple-output |
| NA | Not applicable |
| OTDOA | Observed Time Difference Of Arrival |
| PTP | Precision Time Protocol |
| RBS | Radio Base Station |
| TDD | Time Division Duplexing |
| TLV | Type-Length-Value |
| UE | User Equipment |
| UTRA | Universal Terrestrial Radio Access |

The invention claimed is:

1. A method for relative time error (TE) information distribution in a telecommunication network using a precision time protocol (PTP), the method being performed in a gateway device in a telecommunication network having hierarchical segments and comprising:
   receiving TE information from a telecom grandmaster (T-GM) of the hierarchical segments;
   preserving a total TE information of the received TE information;
   resetting an accumulated path TE of the received TE information; and
   outputting an indication of the reset accumulated path TE and the preserved total TE information to a sub-segment of the hierarchical segments.

2. The method according to claim 1, wherein the resetting comprises replacing a type-length-value (TLV) field of the received TE information to make the gateway device a T-GM of subsequent segments.

3. The method according to claim 2, wherein the resetting further comprises setting an accumulated path TE field to zero.

4. The method according to claim 2, wherein the preserving comprises setting a GM-TE field of the received TE information to a sum of a received GM-TE plus a path TE up to the gateway device.

5. The method according to claim 1, wherein the preserving comprises forwarding a received TLV field unchanged.

6. The method according to claim 5, wherein the preserving further comprises appending a new TLV field with a local clock ID.

7. The method according to claim 5, wherein the resetting comprises setting an accumulated path TE field to zero.

8. The method according to claim 1, wherein the telecommunication network is configured with a higher-level segment to a lower-level segment, and wherein TE information is propagated from the higher-level segment to the lower level lower-level segment.

9. The method according to claim 1, wherein a received priority parameter is replaced by a priority parameter of the gateway device.

10. A gateway device for relative time error (TE) information distribution in a telecommunication network having hierarchical segments and using a precision time protocol (PTP), the gateway device comprising:

a processing circuitry; and a computer program product storing instructions that, when executed by the processing circuitry, cause the gateway device to:

receive TE information from a telecom grandmaster (T-GM) of the hierarchical segments;

preserve a total TE information of the received TE information;

reset an accumulated path TE of the received TE information; and output an indication of the reset accumulated path TE and the preserved total TE information to a sub-segment of the hierarchical segments.

11. A non-transitory computer-readable storage medium comprising computer program for relative time error (TE) information distribution in a telecommunication network having hierarchical segments and using a precision time protocol (PTP), the computer program comprising computer program code which, when run in a gateway device, causes the gateway device to perform operations comprising:

receiving TE information from a telecom grandmaster (T-GM) of the hierarchical segments;

preserving a total TE information of the received TE information;

resetting an accumulated path TE of the received TE information; and outputting an indication of the reset accumulated path TE and the preserved total TE information to a sub-segment of the hierarchical segments.

* * * * *